(12) United States Patent
Jung

(10) Patent No.: US 10,419,520 B2
(45) Date of Patent: Sep. 17, 2019

(54) METHOD OF SHARING ELECTRONIC DOCUMENT AND DEVICES FOR THE SAME

(71) Applicant: Samsung Electronics Co., Ltd., Gyeonggi-do (KR)

(72) Inventor: Min-Woo Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 163 days.

(21) Appl. No.: 14/329,482

(22) Filed: Jul. 11, 2014

(65) Prior Publication Data
US 2015/0019627 A1 Jan. 15, 2015

(30) Foreign Application Priority Data
Jul. 11, 2013 (KR) .................. 10-2013-0081827

(51) Int. Cl.
*H04L 29/08* (2006.01)
(52) U.S. Cl.
CPC ..................... *H04L 67/06* (2013.01)
(58) Field of Classification Search
USPC ......................................................... 709/203
See application file for complete search history.

(56) References Cited

U.S. PATENT DOCUMENTS

| | | | |
|---|---|---|---|
| 6,493,734 B1 | 12/2002 | Sachs et al. | |
| 7,127,673 B2 * | 10/2006 | Iwata | G06F 17/211 |
| | | | 715/209 |
| 2002/0059244 A1 * | 5/2002 | Bunney | H04L 67/42 |
| 2002/0122053 A1 * | 9/2002 | Dutta | G06F 16/9577 |
| | | | 715/729 |
| 2005/0193330 A1 | 9/2005 | Peters | |
| 2007/0055657 A1 | 3/2007 | Yano | |
| 2008/0005176 A1 * | 1/2008 | Shimizu | H04N 1/00244 |
| 2008/0114599 A1 * | 5/2008 | Slotznick | G09B 5/06 |
| | | | 704/260 |
| 2008/0235585 A1 * | 9/2008 | Hart | G06F 16/44 |
| | | | 715/717 |
| 2008/0244381 A1 * | 10/2008 | Nicolaou | G06F 17/2745 |
| | | | 715/234 |
| 2009/0276439 A1 | 11/2009 | Rosenblatt et al. | |
| 2009/0276696 A1 * | 11/2009 | Kapoor | G06F 16/9577 |
| | | | 715/252 |
| 2010/0067064 A1 * | 3/2010 | Shigehisa | H04N 1/40062 |
| | | | 358/403 |
| 2011/0047450 A1 * | 2/2011 | Park | H04N 1/00204 |
| | | | 715/234 |
| 2011/0295879 A1 * | 12/2011 | Logis | G06F 16/9574 |
| | | | 707/769 |

(Continued)

FOREIGN PATENT DOCUMENTS

| | | |
|---|---|---|
| JP | 2006-215619 | 8/2006 |
| JP | 2011-525649 | 9/2011 |

(Continued)

*Primary Examiner* — Sargon N Nano
*Assistant Examiner* — Christopher B Robinson
(74) *Attorney, Agent, or Firm* — The Farrell Law Firm, P.C.

(57) ABSTRACT

Disclosed are an electronic document sharing method and devices allowing a user on a receiver side to easily identify an electronic document by converting a format of the electronic document to a format supportable by the receiver side receiving the electronic document.

19 Claims, 8 Drawing Sheets

(56) References Cited

U.S. PATENT DOCUMENTS

| | | | | |
|---|---|---|---|---|
| 2014/0214503 A1* | 7/2014 | Chircorian | ............. | G06Q 10/10 |
| | | | | 705/14.4 |
| 2014/0348396 A1* | 11/2014 | Laaser | ............... | G06K 9/00442 |
| | | | | 382/113 |
| 2017/0235827 A1* | 8/2017 | Bar-Or | .................. | G06F 16/632 |
| | | | | 707/769 |

FOREIGN PATENT DOCUMENTS

| | | |
|---|---|---|
| JP | 2012-038333 | 2/2012 |
| KR | 1020020066618 | 8/2002 |
| KR | 1020080097579 | 11/2008 |
| KR | 101206404 | 11/2012 |

* cited by examiner

METHOD OF SHARING ELECTRONIC DOCUMENT AND DEVICES FOR THE SAME

PRIORITY

This application claims priority under 35 U.S.C. § 119(a) to Korean Application Serial No. 10-2013-0081827, which was filed in the Korean Intellectual Property Office on Jul. 11, 2013, the contents of which are incorporated herein by reference.

BACKGROUND OF THE INVENTION

1. Field of the Invention

The present invention relates generally to a method of sharing an electronic document, and more particularly, to a method and devices for sharing an electronic document which allow a user on a receiver side to easily identify an electronic document by converting a format of the electronic document into a format supportable by the receiver side receiving the electronic document.

2. Description of the Related Art

The conventional sharing of an electronic document between devices is performed through a method in which, when a device (hereinafter, a server) serving as a server transmits an entire electronic document file to a device (hereinafter, a client) serving as a client, the client stores the electronic document file in a local storage, re-reads the electronic document file, parses the electronic document file to meet a standard, and renders the electronic document file, so as to display the electronic document file to a user.

In general, since most of the electronic document files are large capacity files, the server requires a significant amount of time to transmit the entire file to the client, thereby substantially increasing a network use amount between the server and the client. In addition, when the client does not have the local storage, the client cannot store the electronic document file, and thus cannot display the electronic document file to the user.

Although the client has the local storage, it is difficult to provide the electronic document file including hundreds of pages to the user, since the client has to download the entire electronic document file from the server even though the user desires to view only a part of the electronic document file. For the sake of convenience to the user, the server sometimes provides a pre-scanned image to the client. However, a resolution of the electronic document file provided by the server does not match a resolution of the client since a client setting is not considered. In this case, the client provides a barely readable electronic document to the user due to the resolution problem.

SUMMARY OF THE INVENTION

The present invention has been made to address at least the problems and disadvantages described above, and to provide at least the advantages described below. Accordingly, an aspect of the present invention is to provide an electronic document sharing method and devices for the same which allow a user on a receiver side to easily identify an electronic document by converting a format of the electronic document to a format supportable by the receiver side that receives the electronic document.

In accordance with an aspect of the present invention, a method of sharing an electronic document by a server includes receiving, from a client, a first request for an electronic document, extracting a list from the electronic document, generating a list image including the list and transmitting the list image to the client, receiving, from the client, a second request for a selected item including at least a part of the list, extracting selected data corresponding to the selected item from the electronic document, generating page data by using the selected data, and transmitting, to the client, at least a part of the page data.

In accordance with another aspect of the present invention, a server sharing an electronic document includes a communication module configured to receive a first request for an electronic document from a client, a document parser configured to extract a list from the electronic document, a page generator configured to generate a list image including the list, and a control module configured to control, if a second request for a selected item including at least a part of the list is made by the client through the communication module, the document parser to extract selected data corresponding to the selected item from the electronic document, the page generator to generate page data by using the selected data, and the communication module to transmit at least a part of the page data to the client.

In accordance with another aspect of the present invention, a method of sharing an electronic document by a client includes making a first request for an electronic document to a server, receiving, from the server, a list image including a list of the electronic document, receiving, from a user, a user input for selecting a selected item including at least a part of the list, making, to the server, a second request for selected data corresponding to the selected item, and receiving at least a part of page data or at least a part of converted data as the selected data.

In accordance with another aspect of the present invention, a client sharing an electronic document includes a communication module configured to make a first request for an electronic document to a server, and receive a list image including a list of the electronic document from the server, an input/output module configured to receive a user input for selecting a selected item including at least a part of the list from a user, and a controller configured to control the communication module to make a second request for selected data corresponding to the selected item to the server, and to receive page data or converted data as the selected data.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. Specific definitions found in the following description are provided only to assist in a general understanding of the present invention, and it is apparent to those skilled in the art that the present invention can be implemented without such definitions. Detailed descriptions of well-known functions and structures incorporated herein will be omitted to avoid obscuring the subject matter of the present invention.

Figure 1:
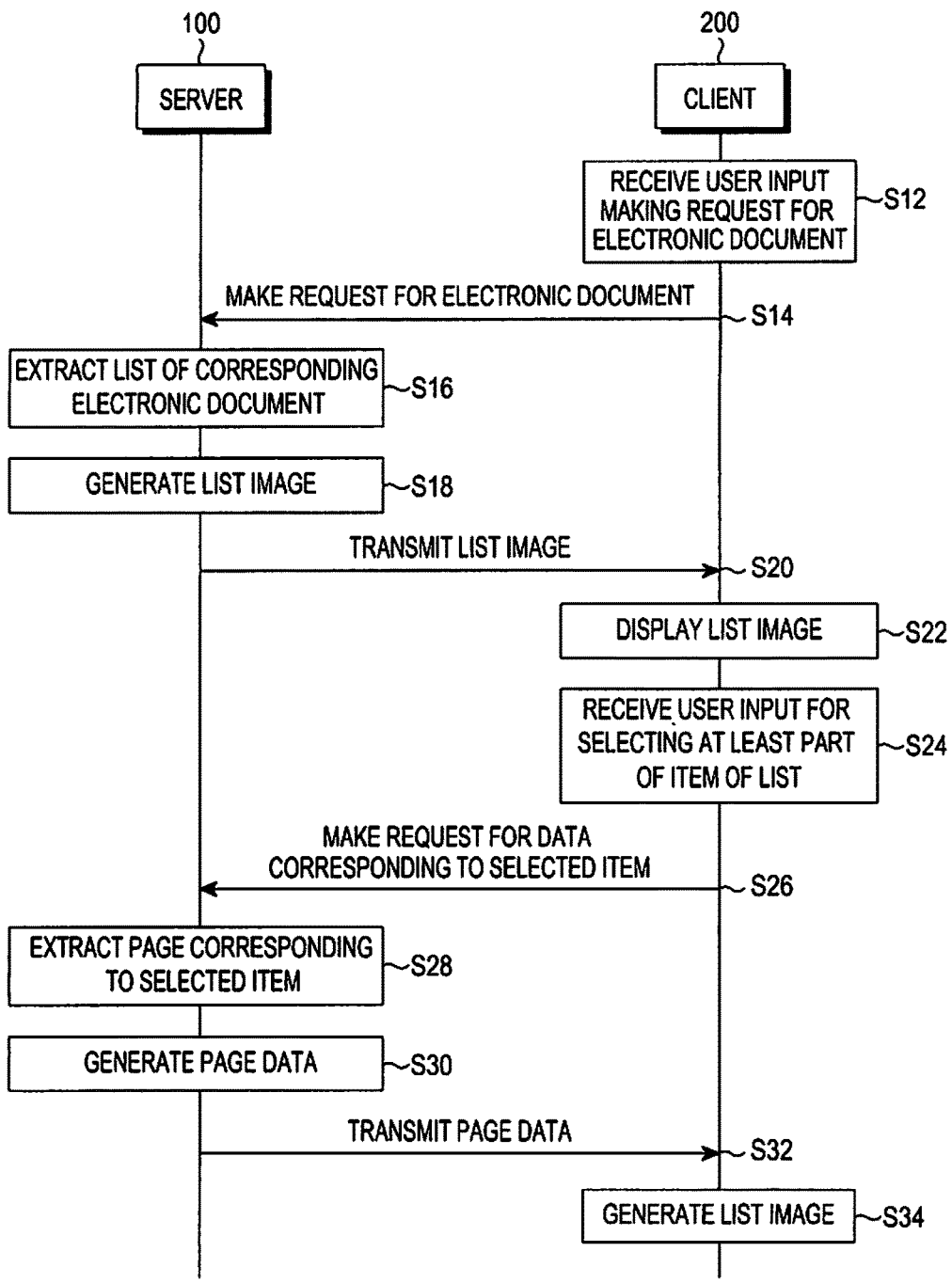
FIG. 1 illustrates an electronic document sharing method between devices included in an electronic document sharing system according to an embodiment of the present invention.

FIG. 1 illustrates a method of sharing an electronic document between devices included in an electronic document sharing system according to an embodiment of the present invention.

Referring to FIG. 1, the electronic document sharing system includes an electronic document service server 100 and an electronic document service client 200.

The client 200 receives a user input of requesting an electronic document from a user who uses the client 200 in step S12. The client 200 requests the electronic document from the server 100 according to the user input in step S14. The client 200 also transmits media type information including information on a resolution and a font of the client 200 and a media type which can be output by the client 200 to the server 100. The server 100 having received the request for the electronic document from the client 200 extracts a list of the corresponding electronic document in step S16. The server 100 generates a list image including the extracted list in step S18, and transmits the list image to the client 200 in step S20.

The client 200 displays the list image in step S22, and receives a user input for selecting at least a part of items of the list included in the list image from the user in step S24. Hereinafter, at least a part of the items selected by the user input from the electronic document is referred to as a "selected item".

The client 200 requests data corresponding to the selected item, that is, selected data from the server 100 in step S26. The server 100 having received the request for the data corresponding to the selected item from the client 200 in step S26 extracts a page corresponding to the selected item from the electronic document in step S28. The server 100 generates the page extracted in step S28 as page data in step S30.

When the page data is generated, the server 100 transmits the page data to the client 200 in step S32. The client 200 having received the page data from the server 100 in step S32 displays the page data in step S34.

The server 100 may convert a format of the page data generated in step S30 to a format supportable by the client 200 according to the media type information. In the present embodiment, the media type information includes at least one of a resolution, a font, and a media type supportable by the client 200. The media type information may further include device version information (for example, a device model name and Operating System (OS) version information) of the client 200 or information on at least one program installed in the client 200 (for example, an e-book or an audio player).

For example, the server 100 may convert the page data to data that has the resolution of the client 200, has the font supportable by the client 200, or has the media type which can be output to a screen 290. That is, the server 100 according to the present embodiment generates the page data according to the request of the client 200 and converts a format of the page data to a format which is displayable by the client 200. Hereinafter, the page data of which the format is converted to the format which is displayable by the client 200 is referred to as "converted data" for the sake of convenience.

Figure 2:
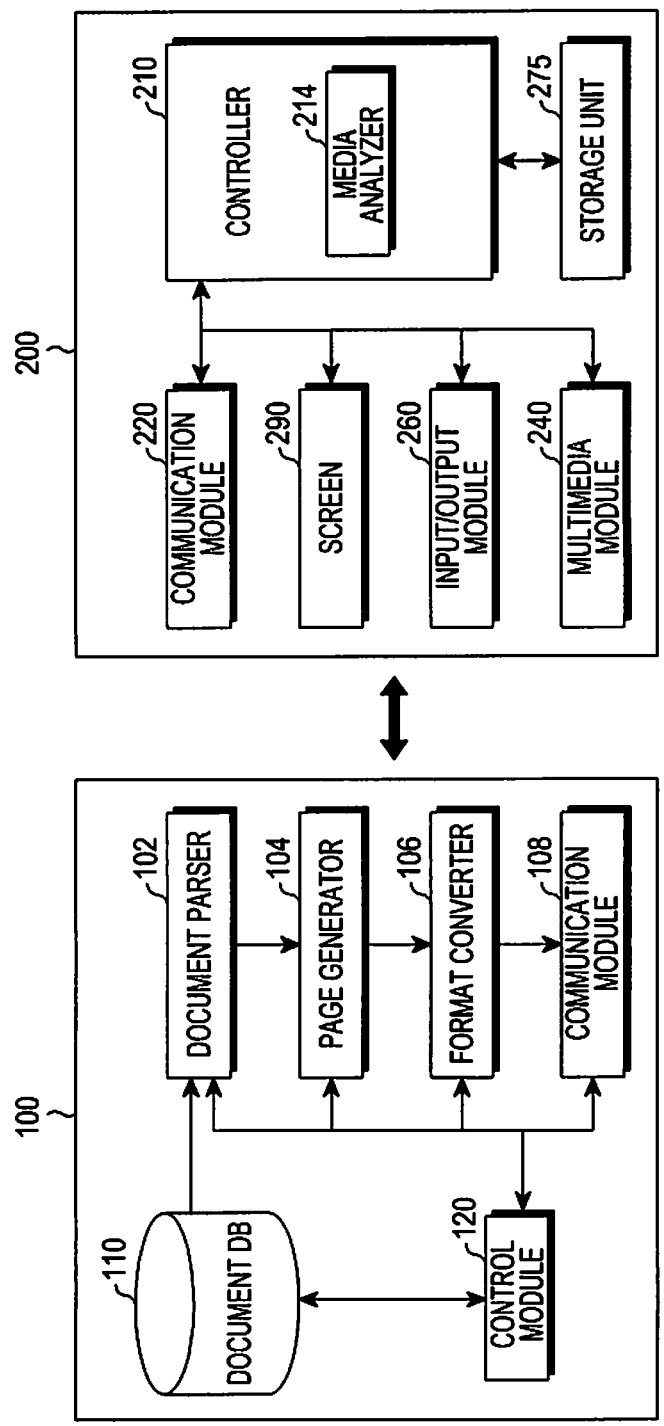
FIG. 2 illustrates configurations of a server and a client included in an electronic document sharing system according to an embodiment of the present invention.

FIG. 2 illustrates configurations of the server and the client included in the electronic document sharing system according to an embodiment of the present invention.

Referring to FIG. 2, the server 100 includes a document parser 102, a page generator 104, a format converter 106, a communication module 108, a document DataBase (DB) 110, and a control module 120.

The document parser 102 parses the electronic document. The document parser 102 according to the present embodiment extracts at least one electronic document from the document DB 110 under a control of the control module 120. When the communication module 108 receives a request for the electronic document from the client 200, the document parser 120 searches for the electronic document requested by the client 200 in the document DB 110 and extracts the electronic document. The document parser 102 extracts a list from the electronic document and transmit the extracted list to the page generator 104. The document parser 102 extracts a page corresponding to a selected item requested by the client 100 from the electronic document and transmits the extracted page to the page generator 104.

The page generator 104 generates a list image or page data. In the present embodiment, the page generator 104 generates a list image or a list text including the list extracted by the document parser 102. The list image may have an image format, for example, JPG, Graphics Interchange Format (GIF), BitMaP (BMP), Tagged Image File Format (TIFF), Portable Network Graphics (PNG), or PDF, and the list text may have a text format, for example, HyperText Markup Language (HTML), eXtensible Markup Language (XML), or TEXT.

The page generator 104 generates data corresponding to the selected item requested by the client 200, that is, selected data as page data. The user using the client 200 may select an item which the user desires to read with reference to the list image displayed through the client 200. The item selected by the user is the selected item, and at least one selected item includes at least a part of the electronic document. For example, when the selected item which the client 200 has requested to the server 100 is "2.1.3 XXXXXXX page 24-56", the page generator 104 generates contents written in pages 24-56 of the electronic document as the page data.

The page data may have an image format such as JPG, GIF, BMP, TIFF, PNG, and PDF, and a text format such as HTML, XML, or TEXT. The page generator 104 generates page data having a format supportable by the client 200 according to the media type information received from the client 200.

The format converter 106 converts the page data according to the media type information. When the page data generated by the page generator 104 is not supported by the client 200, the format converter 106 converts the page data to converted data having a format supported by the client 200 according to the media type information.

The communication module 108 performs a communication function of the server 100. The communication module 108 according to the present embodiment receives a request for the electronic document from the client 200 and transmits a list image to the client 200. The communication module 108 receives a request for data corresponding to the selected item from the client 200 and transmits page data or converted data to the client 200.

At least one electronic document is stored in the document DB 110, which stores media type information corresponding to the client 200.

The control module 120 performs a general operation of the server 100. In the present embodiment, when the electronic document is requested by the client 200, the control module 120 determines whether the electronic document requested by the client 200 is stored in the document DB 110. When the electronic document is not stored in the document DB 110, the control module 120 informs the client 200 that there is no corresponding electronic document in the server 100 through the communication module 108. In contrast, when the electronic document is stored in the document DB 110, the control module 120 controls the document parser 102 to extract a list from the electronic document. The control module 120 controls the page generator 104 to generate a list image including the list extracted by the document parser 102. The control module 120 controls the communication module 108 to transmit the list image to the client 200.

When data corresponding to a selected item is requested by the client 200, the control module 120 extracts data corresponding to the selected item of the electronic document, that is, selected data by controlling the document parser 102. When the data corresponding to the selected item is extracted, the control module 120 controls the page generator 104 to generate page data including the selected data.

When the page data is generated, the control module 120 determines whether the page data generated by the page generator 104 has a format supportable by the client 200. The control module 120 determines whether the page data has the format supportable by the client 200 based on media type information. As a result of the determination, when the page data has the format supportable by the client 200, the control module 120 controls the communication module 108 to transmit the page data to the client 200. In contrast, as a result of the determination, when the page data has the format which is not supportable by the client 200, the control module 120 controls the format convertor 106 to convert the format of the page data to the format supportable by the client 200.

When the list image or the page data is not supported by the client 200 or when a resolution of the client 200 is lower than a resolution pre-stored in the document DB 110, the control module 120 may convert the list image or the page data to voice data by controlling the format converter 106. That is, the client 200 may output the list of the electronic document as a voice or output a part corresponding to the selected item of the electronic document as a voice to provide the output list or part to the user.

Referring to FIG. 2, the client 200 includes a controller 210, a communication module 220, an input/output module 260, a storage unit 275, and the screen 290, and may further include a multimedia module 240. The controller 210 of the client 200 according to the present embodiment includes a media analyzer 214.

The controller 210 controls a general operation of the client 200.

The controller 210 according to the present embodiment requests the electronic document from the server 100 according to a user input made through the input/output module 260. The controller 210 controls the communication module 220 to transmit media type information corresponding to the client 200 to the server 100.

When a list image is transmitted from the server 100 in response to the request for the electronic device, the controller 210 controls the screen 290 to display the list image. When a user input for selecting a selected item is input through the input/output module 260, the controller 210 controls the communication module 220 to request data corresponding to the selected item from the server 100 according to the corresponding user input.

When data corresponding to the selected item, that is, page data or converted data is transmitted from the server 100, the controller 210 controls the screen 290 to display the page data or the converted data. The controller 210 controls the multimedia module 240 to output the voice data converted from the list image or the page data.

The media analyzer 214 generates media type information of the client 200. The media analyzer 214 may analyze media types of the list image, the page data, and the converted data received from the server 100. The controller 210 determines whether the list image, the page data, or the converted data is a media type which is displayable by the client 200 according to the analyzed media types. For example, it is assumed that the media type of the list image which is displayable by the client 200 is Joint Photographic Experts Group (JPEG). It is assumed that when the media type is PDF, the client 100 cannot display the media type. When the media type of the list image received from the server 100 is Portable Document Format (PDF), the media analyzer 214 informs the controller 210 that the media type of the list image is PDF. Accordingly, the controller 210 determines that the client 200 cannot display the list image received from the server 100.

The communication module 220 performs communication of the client 200. The communication module 220 according to the present embodiment requests the electronic document from the server 100 according to a user input made through the input/output module 260. The communication module 220 receives the list image from the server 100. The communication module 220 requests data corresponding to the selected item from the server 100 and receives page data or converted data from the server 100 as the data corresponding to the selected item.

The multimedia module 240 reproduces the media data stored in the client 200. The multimedia module 240 according to the present embodiment may reproduce the voice data converted from the list image or the page data.

The input/output module 260 receives a user input made by the user. The input/output module 260 according to the present embodiment receives a user input for requesting the electronic document from the user. The input/output module 260 receives a user input for requesting the selected item of the list included in the list image from the user. The input/output module 260 receives a user input for displaying the page data or the converted data received from the server 100.

Various types of data of the client 200 are stored in the storage unit 275. The storage unit 275 according to the present embodiment may store media type information, which is on a resolution, a font, and a media type supportable by the client 200. The storage unit 275 may store the page data or the converted data received from the server 100.

The screen 290 displays the various types of data stored in the client 200. The screen 290 according to the present embodiment displays the list image and the page data or the converted data.

Figure 3:
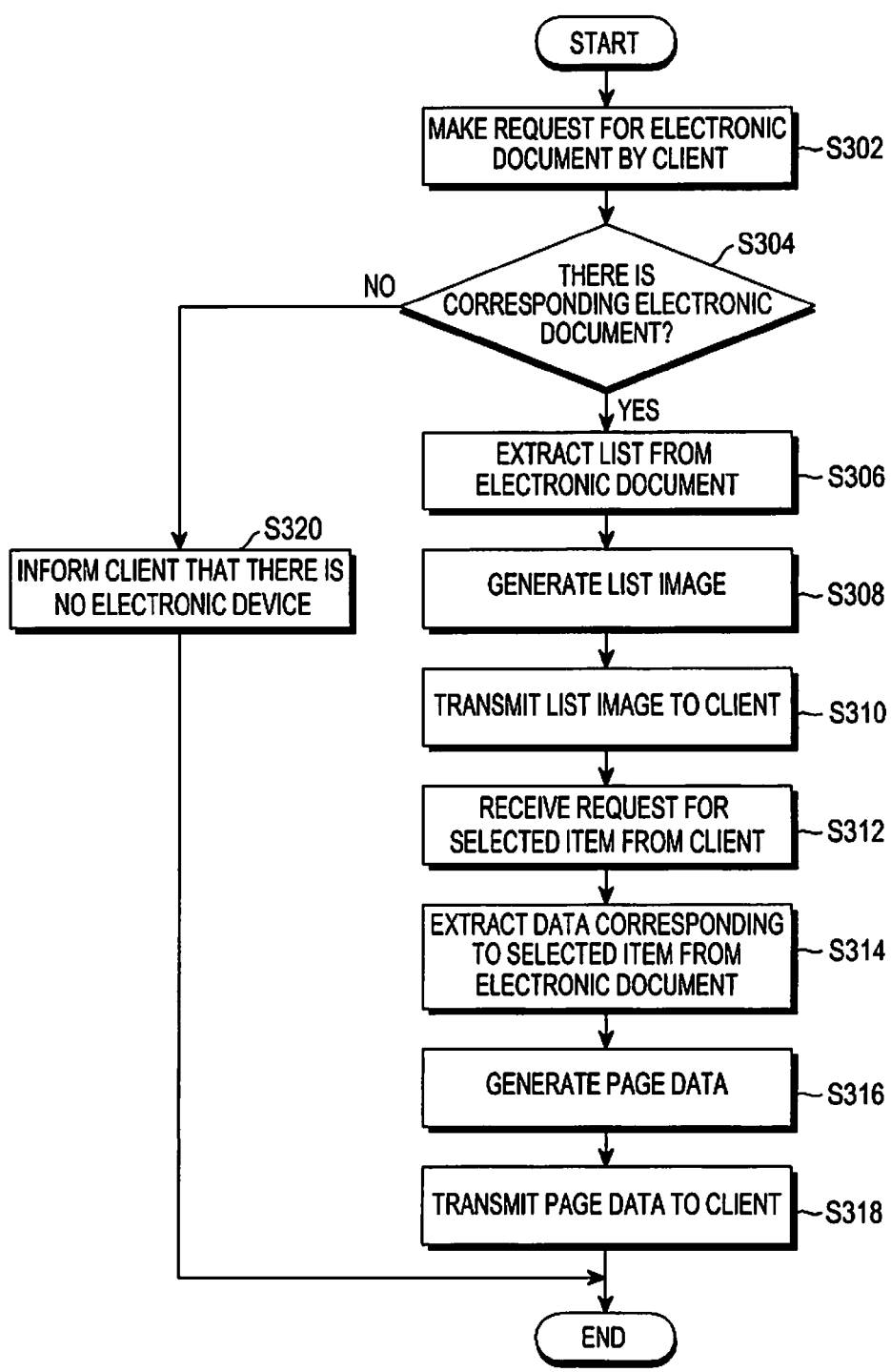
FIG. 3 illustrates an example of a method in which the server illustrated in FIG. 2 shares the electronic document.

FIG. 3 illustrates an example of a method in which the server illustrated in FIG. 2 shares the electronic document.

Referring to FIG. 3, the server 100 receives a request for the electronic document from the client 200 in step S302. The server 100 may simultaneously receive the request for the electronic document from the client 200 and media type information corresponding to the client 200. The server 100 may receive the request for the electronic device by receiving the media type information from the client 200. The server 100 may pre-store the media type information of the client 200. When the electronic document is requested by the client 200 in step S302, the control module 120 of the server 100 determines whether there is the corresponding electronic document in the document DB 110 in step S304. In the present embodiment, the control module 120 searches for the electronic document in the document DB 110 and extracts the electronic document by controlling the document parser 102.

As a result of the determination in step S304, when there is no electronic document requested by the client 200 in the server 100 in step S304, the server 100 informs the client 200 that there is no electronic device in step S320.

As a result of the determination in step S304, when there is the electronic document requested by the client 200 in the server in step S304, the control module 120 extracts a list from the corresponding electronic document by controlling the document parser 102 in step S306. The page generator 104 generates a list image including the list extracted in step S306 based on media type information in step S308. The communication module 108 transmits the list image to the client 200 in step S310.

Thereafter, the communication module 108 of the server 100 receives a request for the selected item from the client 200 in step S312. The control module 120 extracts data corresponding to the selected item from the electronic document by controlling the document parser 102 in step S314. The page generator 104 generates page data including the data extracted in step S314 in step S316. The communication module 108 transmits the page data to the client 200 in step S318.

Steps S308 to S312 in which the server 100 generates the list image, transmits the list image to the client 200, and receives the selected item from the client 200, may be omitted. When the request for the electronic document is received from the client 200, the server 100 determines whether at least a part of the electronic document has been previously transmitted to the client 200. When the server 100 has previously transmitted the part of the electronic document to the client 200, the server 100 transmits a part 200 of the electronic document except for the part previously transmitted to the client to the client 200. For example, when the electronic document has a total of pages 1 to 200 and the client 200 has previously received pages 1 to 150 from the server 100, the server 100 transmits pages 151 to 200 corresponding to the remainder of the electronic document to the client 200.

The control module 120 of the server 100 may store a record in which the client 200 requests the electronic document and receives the electronic document in the document DB 110 as log information. The log information indicates whether, for example, at least a part of the electronic document received by the client 200 is page data (for example, text or image) or converted data (for example, voice data). The log information may have a record of the part which the client 200 has received or the part which the client 200 has not received. For example, the log information may have a record indicating that the client 200 has already received the part of the electronic document corresponding to pages 1 to 150 of the electronic document having a total of pages 1 to 200. As described above, the control module 120 stores the log information corresponding to each of the clients 200 in the document DB 110. The control module 120 determines at least a part of the electronic document to be transmitted to the corresponding client 200 based on the log information.

Figure 4:
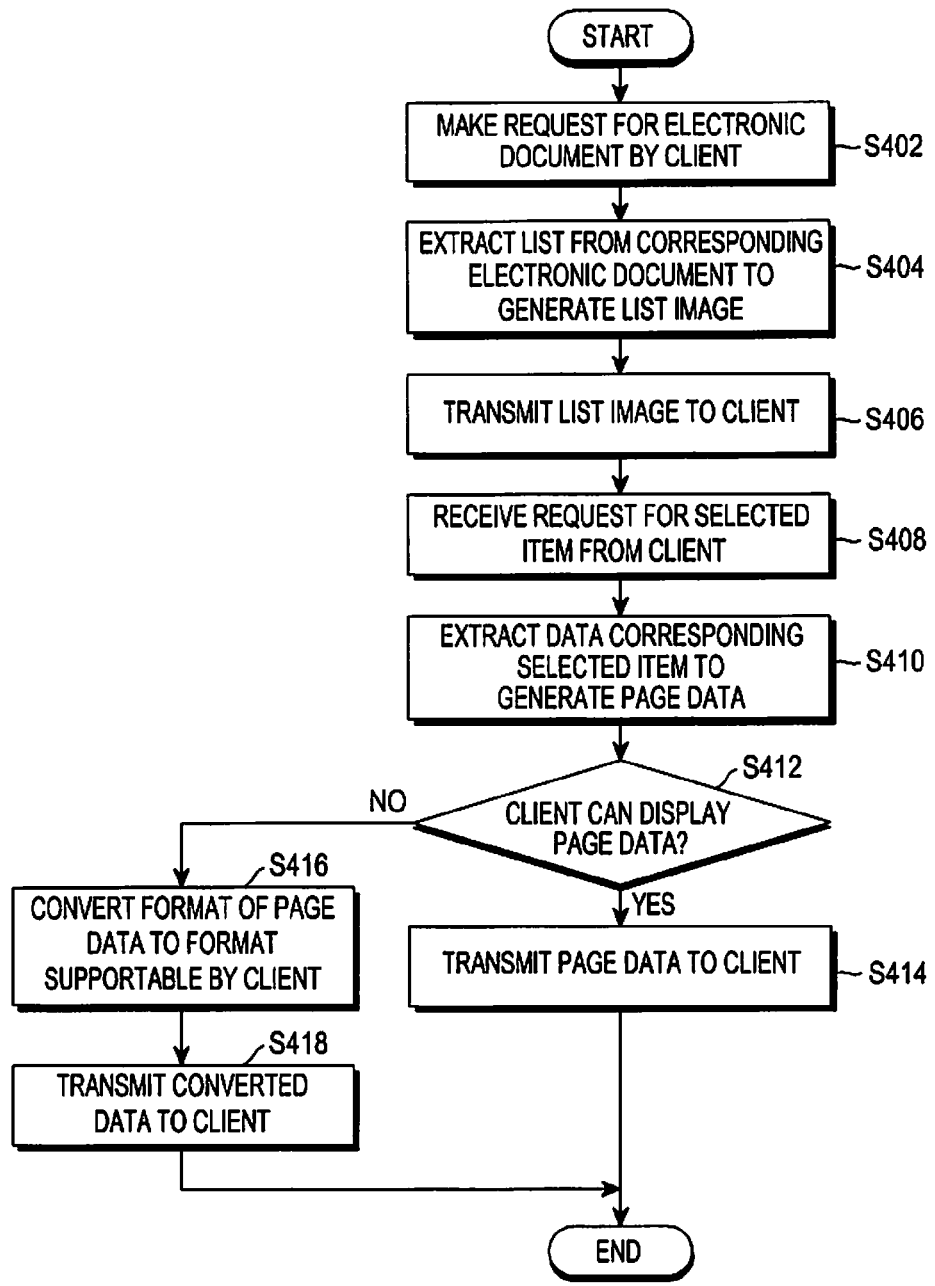
FIG. 4 illustrates another example of a method in which the server illustrated in FIG. 2 shares the electronic document.

FIG. 4 illustrates an example of a method in which the server illustrated in FIG. 2 shares the electronic document. In FIG. 4, it is assumed that the electronic document requested by the client 200 is already stored in the document DB 110.

Referring to FIG. 4, the server 100 receives a request for the electronic document from the client 200 in step S402. The server 100 may simultaneously receive the request for the electronic document from the client 200 and media type information corresponding to the client 200. The server 100 may receive the request for the electronic device by receiving the media type information from the client 200. The server 100 may pre-store the media type information of the client 200.

The document parser 102 and the page generator 104 of the server 100 extract a list from the electronic document requested by the client 200 and generates a list image in step S404. When the list image is generated, the communication module 108 transmits the list image to the client 200 in step S406.

Thereafter, the communication module 108 of the server 100 receives a request for a selected item from the client 200 in step S408. The control module 120 extracts data corresponding to the selected item from the electronic document and generates page data by controlling the document parser 102 and the page generator 104 in step S410.

When the page data is generated, the control module 120 determines whether the client 200 can display the page data in step S412. That is, the control module 120 determines whether the page data generated by the page generator 104 has a format supportable by the client 200. The control module 120 determines whether the page data has the format supportable by the client 200 based on media type information. The control module 120 according to the present invention compares a resolution, a font, and a media type of the page data with a resolution, a font, and a media type supportable by the client 200. When at least one of the resolution, the font, and the media type of the page data does not match the resolution, the font, and the media type of the client 200, the control module 120 determines that the client 200 cannot display the page data.

As a result of the determination of S412, when the client 200 can display the page data in step S412, the control module 120 transmits the page data to the client 200 by controlling the communication module 108 in step S414.

As a result of the determination of S412, when the client 200 cannot display the page data in step S412, the control module 120 converts a format of the page data to the format supportable by the client 200 by controlling the format converter 106. The format converter 106 converts the page data to converted data based on the media type information. The format converter 106 may convert the page data to have the resolution, the font, and the media type supportable by the client 200.

When the page data is converted to the converted data which is displayable by the client 200, the control module 120 transmits the converted data to the client 200 by controlling the communication module 108 in step S418.

Figure 5:
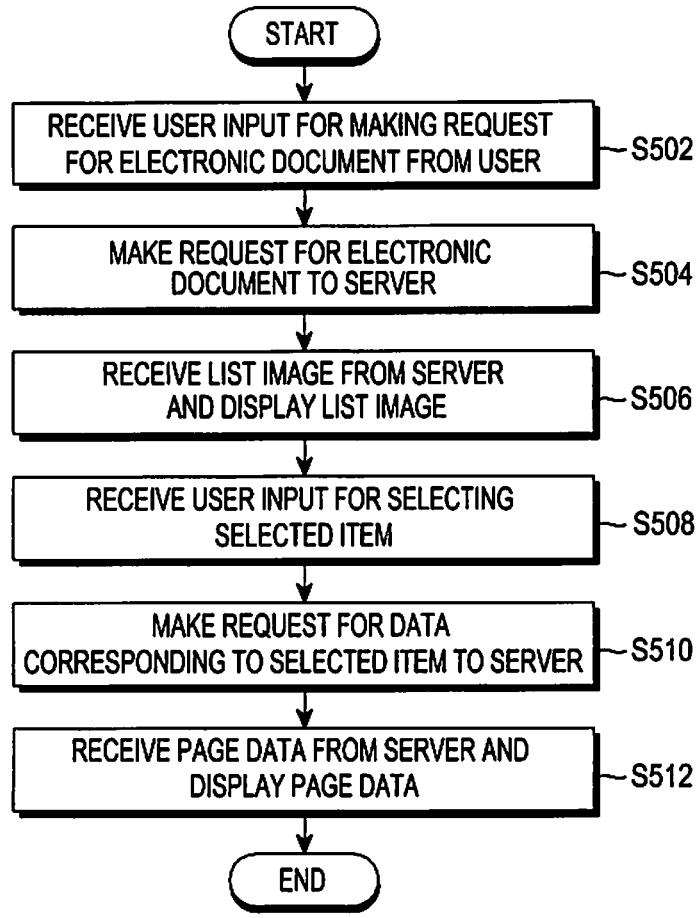
FIG. 5 illustrates an example of a method in which the client illustrated in FIG. 2 shares the electronic document.

FIG. 5 illustrates an example of a method in which the server illustrated in FIG. 2 shares the electronic document.

Referring to FIG. 5, the input/output module 260 of the client 200 receives a user input for requesting the electronic document from the user in step S502. In step S504, the communication module 220 requests the electronic document from the server 100 based on the user input received in step S502. The client 200 may simultaneously request the electronic document from the server 100 and transmit media type information corresponding to the client 200 to the server 100. The client 200 may request the electronic document by transmitting the media type information to the server 100. However, the server 100 may pre-store the media type information of the client 200. Thereafter, in step 506, the client 200 displays a list image including a list of the corresponding electronic document from the server 100 through the communication module 220 and displays the list image on the screen 290.

When the input/output module 260 receives a user input for selecting a selected item of the list included in the list image from the user in step S508, the communication module 220 requests data corresponding to the selected item, that is, selected data to the server 100 in step S510. When the server 100 transmits page data to the client 200 as the selected data corresponding to the selected item, the communication module 220 and the screen 290 of the client 200 receive the page data from the server 100 and display the page data in step S512.

The communication module 220 may be the selected data corresponding to the selected item, and may receive converted data converted from the page data, the converted data having a media type supportable by the client 200. Even when the converted data is received, the screen 290 displays the converted data.

The communication module 220 may receive voice data as the converted data. When the page data is a media type which cannot be supported by the client 200, the server 100 may convert the page data to the voice data and transmit the voice data to the client 200. Alternatively, when readability of the page data or the converted data is low when the page data or the converted data is displayed on the screen 290 of the client 200 (for example, a character size is less than a reference value preset by the client 200), the control module 120 controls the format converter 108 to convert the page data to the voice data. As described above, when the data corresponding to the selected item is transmitted as the voice data, the controller 210 of the client 200 outputs and provides the voice data to the user by controlling the multimedia module 240.

Figure 6:
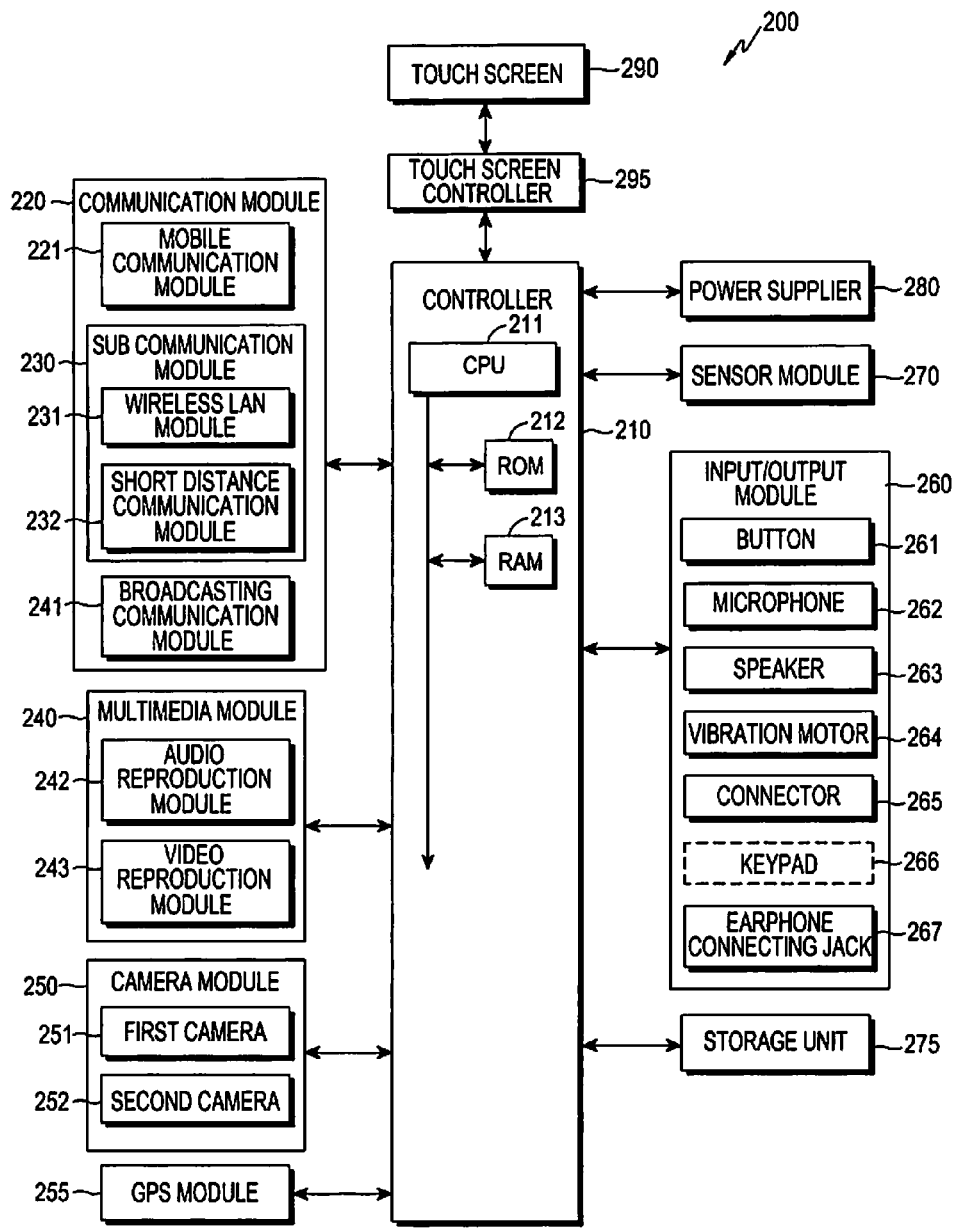
FIG. 6 illustrates a configuration of a client included in an electronic document sharing system according to another embodiment of the present invention.

FIG. 6 illustrates a configuration of the client included in the electronic document sharing system according to an embodiment of the present invention. FIG. 5 illustrates the client 200 implemented as a mobile terminal.

Referring to FIG. 6, the client 200 includes the controller 210 including the media analyzer 214, the mobile communication module 220, the multimedia module 240, the input/output module 260, the storage unit 275, and the screen 290, and further includes at least one of a sub communication module 230, a camera module 250, a sensor module 270, a power supplier 280, and a screen controller 295.

The controller 210 includes a Central Processing Unit (CPU) 211, a Read-Only Memory (ROM) 214 storing a control program for controlling the client 200, and a Random Access Memory (RAM) 213 used as a storage area for storing a signal or data input from the outside of the client 200 or for work performed in the client 200. The CPU 211 includes a single core, a dual core, a triple core, or a quadruple core processor. The CPU 211, the ROM 214, and the RAM 213 may be mutually connected to each other through an internal bus.

The controller 210 controls the mobile communication module 220, the sub communication module 230, the multimedia module 240, the camera module 250, the Global Positioning System (GPS) module 255, the input/output module 260, the sensor module 270, the storage unit 275, the power supplier 280, the screen 290, and the screen controller 295.

The controller 210 controls various types of data displayed on the screen 290 or the display of the data by controlling the screen 290. The controller 110 controls the client 200 to perform an operation according to a user input detected through the screen 290, for example, a touch input or a hovering input. When the user input is made through the screen 290, the controller 210 controls the client 200 to perform the operation corresponding to the user input.

The controller 210 according to the present embodiment requests the electronic document from the server 100 according to a user input made through the input/output module 260. The controller 210 controls the communication module 220 to transmit media type information corresponding to the client 200 to the server 100.

When a list image is transmitted from the server 100 in response to the request for the electronic device, the controller 210 controls the screen 290 to display the list image. When a user input for selecting a selected item is input through the input/output module 260, the controller 210 controls the communication module 220 to request data corresponding to the selected item from the server 100 according to the corresponding user input.

When data corresponding to the selected item, that is, page data or converted data is transmitted from the server 100, the controller 210 controls the screen 290 to display the page data or the converted data. The controller 210 may control the multimedia module 240 to output voice data converted from the list image or the page data.

Although not illustrated in FIG. 6, the controller 210 may include the media analyzer 214 that generates media type information of the client 200 and analyzes a media type of the list image, the page data, or the converted data received from the server 100.

The communication module 220 performs communication of the client 200. The communication module 220 according to the present embodiment requests the electronic document from the server 100 according to a user input made through the input/output module 260. The communication module 220 receives the list image from the server 100. The communication module 220 requests data corresponding to the selected item from the server 100 and receives page data or converted data from the server 100 as the data corresponding to the selected item.

The mobile communication module 221 enables the client 200 to be connected with an external device by using at least one antenna (not shown) under a control of the controller 210. The client 200 and the external device are connected to each other through mobile communication. The mobile communication module 221 transmits/receives a wireless signal for a voice call, a video call, a Short Message Service (SMS), or a Multimedia Message Service (MMS) to/from a mobile phone (not shown), a smart phone (not shown), a tablet Personal computer (PC), or another device (not shown) having a phone number input into the client 200.

The sub communication module 230 includes at least one of a wireless Local Area Network (LAN) module 231 and a short distance communication module 232. For example, the sub communication module 231 includes only the wireless LAN module 232, only the short distance communication module 231, or both the wireless LAN module 232 and the short distance communication module 232.

The wireless LAN module 231 may be Internet-connected in a location where a wireless Access Point (AP) (not shown) is installed according to a control of the controller 210. That is, the wireless LAN module 231 supports a wireless Internet connection of the client 200. The wireless LAN module 231 supports a wireless LAN standard (IEEE802.11x) of the Institute of Electrical and Electronics Engineers (IEEE). The short distance communication module 232 wirelessly performs short distance communication between the client 200 and an image forming device (not shown) according to a control of the controller 210. A short distance communication scheme may include, for example, Bluetooth®, Infrared Data Association (IrDA) communication, WiFi-Direct communication, and Near Field Communication (NFC).

The client 200 includes at least one of the mobile communication module 221, the wireless LAN module 231, and the short distance communication module 232 according to a capability thereof. For example, the client 200 includes a combination of the mobile communication module 221, the wireless LAN module 231, and the short distance communication module 232 according to a capability thereof.

The multimedia module 240 includes at least one of a broadcasting communication module 241, an audio reproduction module 242, and a video reproduction module 243. The multimedia module 260 reproduces the media data stored in the client 200. The multimedia module 260 according to the present embodiment may reproduce voice data converted from the list image or the page data.

The broadcasting communication module 241 receives a broadcasting signal (for example, a TeleVision (TV) broadcasting signal, a radio broadcasting signal, or a data broadcasting signal) and broadcasting supplement information such as Electric Program Guide (EPG) or Electric Service Guide (ESG), output from a broadcasting station through a broadcasting communication antenna (not shown) according to a control of the controller 210. The broadcasting communication module 241 outputs the data received through the mobile communication module 220 to the screen 290. The audio reproduction module 242 may reproduce a digital audio file, such as a file having a file extension of Motion Pictures Experts Group (MPEG) Layer Audio 3 (MP3), Windows® Media Audio (WMA), ogg, or Wafeform Audio File (WAV) stored or received according to a control of the controller 210. The video reproduction module 243 may reproduce a digital video file, such as a file having a file extension of MPEG, MPG, MP4, Audio Video Interleaved (AVI), MOV, or MKV stored or received according to a control of the controller 210. The video reproduction module 243 may reproduce the digital audio file.

The multimedia module 240 may include only the audio reproduction module 242 and the video reproduction module 243 corresponding to the remainder except for the broadcasting module 241. The audio reproduction module 242 or the video reproduction module 243 of the multimedia module 240 may be included in the controller 110.

The camera module 250 includes at least one of a first camera 251 and a second camera 252 for photographing a still image or a video according to a control of the controller 210. The first camera 251 or the second camera 252 may include an auxiliary light source such as a flash (not shown) providing light required for the photographing. The first camera 251 may be disposed on a front surface of the client 200, and the second camera 252 may be disposed on a back surface of the client 200. The first camera 251 and the second camera 252 may be closely located to each other (for example, an interval between the first camera 251 and the second camera 252 is greater than 1 cm and less than 8 cm) and photograph a three dimensional (3-D) still image or a 3-D video.

The GPS module 255 receives radio waves from a plurality of GPS satellites (not shown) in Earth's orbit and calculate a position of the client 200 by using Time of Arrival from the GPS satellites to the client 200.

The input/output module 260 includes at least one of a plurality of buttons 261, a microphone 262, a speaker 263, a vibration device 264, a connector 265, and a keypad 266.

The buttons 261 may be formed on a front surface, a side surface, or a back surface of a housing of the client 200, and may include at least one of a power/lock button (not shown), a volume button (not shown), a menu button, a home button, a back button, and a search button 261.

The input/output module 260 receives a user input made by the user. The input/output module 260 according to the present embodiment receives a user input for requesting the electronic document, from the user. The input/output module 260 receives a user input for requesting a selected item from a list included in the list image, from the user. The input/output module 260 receives a user input for displaying page data or converted data received from the server 100.

The microphone 262 receives a voice or a sound to generate an electrical signal according to a control of the controller 210.

The speaker 263 may output sounds corresponding to various signals (for example, a wireless signal, a broadcasting signal, a digital audio file, a digital video file, or taking a picture) of the mobile communication module 120, the sub communication module 230, the multimedia module 240, or the camera module 250 to the outside of the client 200 according to a control of the controller 210. The speaker 263 may output a sound (for example, button tone corresponding to phone communication, ringing tone, and a voice of another user) corresponding to a function performed by the client 200. One or a plurality of speakers 163 may be formed on a suitable position or positions of the housing of the client 200, to output voice data converted from the page data under a control of the controller 210.

The vibration device 264 converts an electrical signal to a mechanical vibration according to a control of the controller 210. For example, when the client 200 in a vibration mode receives a voice call from another device (not shown), the vibration device 264 is operated. One or a plurality of vibration devices 164 may be formed within the housing of the client 200. The vibration device 264 may operate in accordance with a touch action of the user on the screen 290 or successive motions of the touch on the screen 290.

The connector 265 may be used as an interface for connecting the client 200 with an external device (not shown) or a power source (not shown). The client 200 transmits or receives data stored in the storage unit 275 of the client 200 to or from an external device (not shown) through a wired cable connected to the connector 265 according to a control of the controller 210. The client 200 receives power from the power source (not shown) through the wired cable connected to the connector 265 or charges a battery (not shown) by using the power source.

The keypad 266 receives a key input from the user to control the client 200. The keypad 266 includes a physical keypad (not shown) formed in the client 200 or a virtual keypad (not shown) displayed on the screen 290. The physical keypad (not shown) formed in the client 200 may be excluded according to a capability or structure of the client 200.

An earphone (not shown) may be inserted into an earphone connecting jack 267 to be connected with the client 200.

The sensor module 270 includes at least one sensor for detecting a state of the client 200. For example, the sensor module 270 may include a proximity sensor for detecting whether the user approaches the client 200, an illuminance sensor (not shown) for detecting an amount of light around the client 200, a motion sensor (not shown) for detecting an operation (for example, a rotation of the client 200, or an acceleration or a vibration applied to the client 200) of the client 200, a geo-magnetic sensor (not shown) for detecting a point of the compass by using Earth's magnetic field, a gravity sensor for detecting an action direction of the gravity, and an altimeter for measuring atmospheric pressure to detect an altitude. At least one sensor detects a state, generates a signal corresponding to the detection, and transmits the signal to the controller 210. The sensors of the sensor module 270 may be added or omitted according to the capability of the client 200.

The sensor module 270 according to the present embodiment includes the proximity sensor, which detects a user's motion (for example, a motion of a user's finger) within a range close to the screen 290. For example, when the screen 290 is implemented in a capacitive type, the sensor module 270 implemented by the proximity sensor may detect a user's motion by detecting a change in capacitance generated in a range (for example, a height of 10 cm from the screen 290) of the screen 290. The user's motion detected as described above also may be included in the user input.

The storage unit 275 stores a signal or data input/output according to the operation of the communication module 220, the sub communication module 230, the multimedia module 240, the camera module 250, the GPS module 255, the input/output module 260, the sensor module 270, or the screen 290. The storage unit 275 stores a control program and applications for controlling the client 200 or the controller 210.

Various data of the client 200 is stored in the storage unit 275 according to the present embodiment. The storage unit 275 may store media type information of the client 200, on a resolution, a font, and a media type supportable by the client 200. In step Some embodiments, the storage unit 275 stores the page data or the converted data received from the server 100.

The term "storage unit" includes the storage unit 275, the ROM 214 and the RAM within the controller 210, or a memory card (not shown) (for example, an SD card or a memory stick) installed in the client 200. The storage unit may include a non-volatile memory, a volatile memory, a Hard Disk Drive (HDD), or a Solid State Drive (SSD).

The power supplier 280 may supply power to one or more batteries (not shown) arranged at the housing of the client 200 to supply power to the client 200, according to a control of the controller 210. The power supplier 280 may supply power input from an external power source (not shown) to the client 200 through a wired cable connected to the connector 265. In addition, the power supplier 280 may supply power wirelessly input from the external power source to the client 200 through a wireless charging technology.

The screen 290 displays the various data stored in the client 200. The screen 290 according to the present embodiment displays the list image received from the server 100, and the page data or the converted data.

The screen 290 may be implemented in a form of a touch screen to receive a user input (touch input) generated by a contact between a part of a user's body (for example, a finger) and the screen 290 from the user. Accordingly, the screen 290 may receive at least one of a user input for requesting the electronic document, a user input for selecting a selected item from the list included in the list image, and a user input for displaying the page data or the converted data from the user.

The screen 290 provides user interfaces corresponding to various services (for example, a phone call, data transmission, broadcasting, and photography) to the user. The screen 290 transmits an analog signal (touch input) corresponding to at least one touch input into the user interface to the screen controller 295, receives at least one touch through a user's body (for example, fingers including a thumb) or a touchable input means (for example, a stylus pen), receives successive motions of one touch among the at least one touch, and transmits an analog signal corresponding to the successive motions of the input touch to the screen controller 295.

The touch according to the present invention is not limited to the contact between the screen 290 and the user's body or the touchable input means, and may include a non-contact (for example, a detectable interval between the screen 290 and the user's body or the touchable input means is lessless than or equal to 1 mm). The detectable interval of the screen 290 may be changed according to a capability or structure of the client 200.

The screen 290 may be implemented in a resistive type, a capacitive type, an infrared type, or an acoustic wave type.

The screen controller 295 converts an analog signal received from the screen 290 to a digital signal (for example, X and Y coordinates) and transmits the converted digital signal to the controller 210. The controller 210 controls the screen 290 by using the digital signal received from the screen controller 295. For example, the controller 210 enables a short-cut icon (not shown) displayed on the screen 290 to be selected or executed in response to the touch. The screen controller 295 may be included in the controller 210.

The screen controller 295 extracts a coordinate on the screen 290 corresponding to a proximity sensing input detected by the sensor module 270. For example, it is assumed that a proximity sensing input for selecting one point (first point) within a range close to the screen 290 is detected by the sensor module 270. It is assumed that the proximity sensing is implemented in the capacitive type. The sensing module 270 may detect a change in capacitance generated within a range of the screen 290 and control the screen controller 295 to extract a coordinate of a point (second point) on the screen 290 corresponding to the point (first point) where the capacitance has been changed. For example, the second point may be one point on the screen 290 located closest to the first point.

The client 200 may be connected with an external device (not shown) by using an external device connector such as the sub communication module 230, the connector 265, and the earphone connecting jack 267.

The "external device" includes various devices attached to or detached from the client 200 through a wire, such as an earphone, an external speaker, a Universal Serial Bus (USB) memory, a charger, a cradle/dock, a Digital Multimedia Broadcasting (DMB) antenna, a mobile payment related device, a health management device such as a blood sugar tester, a game machine, and a car navigation device. The "external device" may include a Bluetooth® communication device, a short distance communication device such as a Near Field Communication (NFC) device, a Wi-Fi Direct communication device, and a wireless Access Point (AP) which may be wirelessly connected to the client 200. In addition, the external device may include another device, a mobile phone, a smart phone, a tablet PC, a desktop PC, and a server.

The server 100 may be implemented by a device having the same configuration as that of the client 200 illustrated in FIG. 6. As described above, when the server 100 has the same structure as that of the client 200, the control module 120 is included in the controller 210. The controller 210 may be implemented to include the document parser 102, the page generator 104, and the format converter 106, and the storage unit 275 may include the document DB 110.

Figure 7:
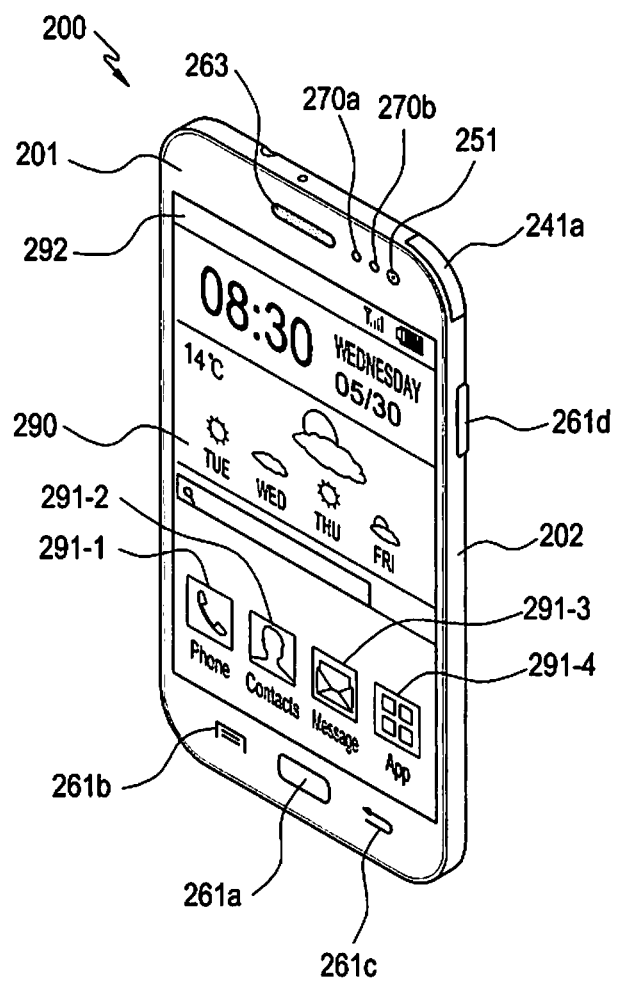
FIG. 7 is a front perspective view of the client illustrated in FIG. 6.
Figure 8:
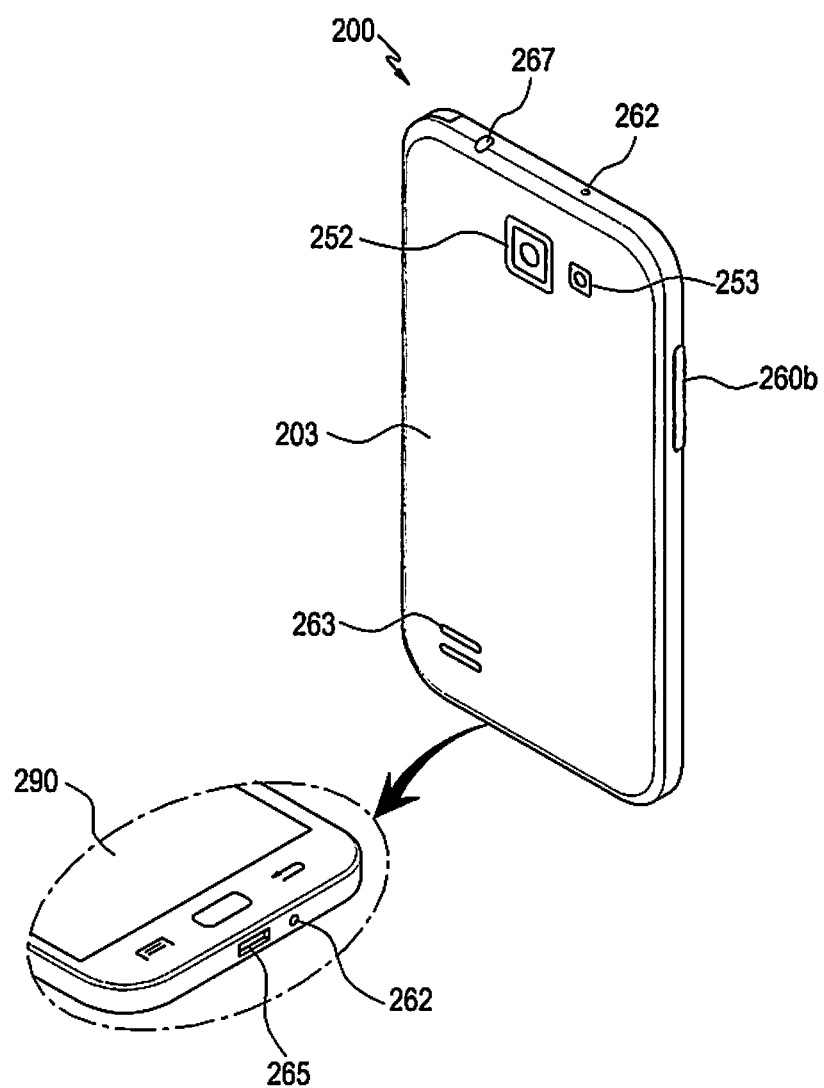
FIG. 8 is a rear perspective view of the client illustrated in FIG. 6.

FIG. 7 is a front perspective view of the client illustrated in FIG. 6, and FIG. 8 is a rear perspective view of the client illustrated in FIG. 6.

Referring to FIG. 7, the screen 290 is located at a center of the front surface 201 of the client 200. The screen 290 has a large size to occupy most of the front surface 201 of the client 200.

FIG. 7 illustrates an example in which a main home screen is displayed on the screen 290. The main home screen is a first screen displayed on the screen 290 when power of the client 200 is turned on. When the client 200 has different home screens of several pages, the main home screen may be a first home screen of the home screens of several pages. Short-cut icons 291-1, 291-2, and 291-3 for executing frequently used applications, a main menu switching key 291-4, time, weather and the like may be displayed on the home screen. The main menu switching key 291-4 displays a menu screen on the screen 290. A status bar 292 which displays the status of the client 200 such as a battery charging status, intensity of a received signal, and a current time may be formed on an upper end of the screen 290.

A home button 261a, a menu button 261b, and a back button 261c may be formed below the screen 290. The home button 261a displays the main home screen on the screen 290. For example, when the home button 261a is touched when any home screen different from the main home screen or the menu screen is displayed on the screen 290, the main home screen is displayed on the screen 290. When the home button 261a is pressed while applications are executed on the screen 290, the main home screen illustrated in FIG. 6 may be displayed on the screen 290. In addition, the home button 261a may be used to display recently used applications or a task manager on the screen 290.

The menu button 261b provides a connection menu which can be used on the screen 290. The connection menu includes, for example, a widget addition menu, a background changing menu, a search menu, an editing menu, and an environment setup menu.

The back button 261c may be used for displaying the screen which was executed just before the currently executed screen or terminating the most recently used application.

The first camera 251, the illumination sensor 270a, and the proximity sensor 270b may be disposed on edges of the front surface 201 of the client 200. The second camera 252, a flash 253, and the speaker 263 may be disposed on the rear surface 203 of the client 200.

For example, a power/reset button 260a, the volume button 261b, a terrestrial DMB antenna 241a for broadcasting reception, and one or a plurality of microphones 262 may be disposed on the side surface 202 of the client 200.

The DMB antenna 241a may be fixed to the client 200 or may be formed to be detachable from the client 100.

As illustrated in FIG. 8, the connector 265 is formed on a lower side surface of the client 200. A plurality of electrodes are formed in the connector 265, which may be connected to the external device through a wire. The earphone connecting jack 267 may be formed on a side surface of an upper end of the client 200. Earphones may be inserted into the earphone connecting jack 267.

According to the present invention, an electronic document sharing method and devices for the same are provided, in which a user on a receiver side can easily identify an electronic document by converting the electronic document to have format supportable by the receiver side that receives the electronic document.

The electronic document sharing method according to an embodiment of the present invention can be implemented by hardware, software, or a combination of the hardware and the software.

Any such software may be stored, for example, in a volatile or non-volatile storage device such as a Read-Only Memory (ROM), a memory such as a Random Access Memory (RAM), a memory chip, a memory device, or a memory IC, or a recordable optical or magnetic medium such as a Compact Disc (CD), a Digital Video Disc (DVD), a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention.

Accordingly, the present invention includes a program for a code implementing the apparatus and method described in the appended claims of the specification and a machine (a computer or the like)-readable storage medium for storing the program. Moreover, such a program as described above can be electronically transferred through an arbitrary medium such as a communication signal transferred through cable or wireless connection, and the present invention properly includes the things equivalent to that.

A server or a client that share the electronic document may receive a program from a program providing apparatus connected with the server or the client wirelessly or through a wire and store the received program. The program providing apparatus may include a memory for storing a program containing instructions for allowing the server or the client to perform a preset content protecting method and information required for the content protecting method, a communication unit for performing wired or wireless communication with the server or the client, and a controller for transmitting the corresponding program to the client or the server according to a request of the server or the client or automatically.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of sharing an electronic document by a server, the method comprising:
   receiving, from a client, a first request for an electronic document;
   obtaining a list based on the electronic document;
   transmitting the list to the client;

receiving, from the client, a second request for selecting at least a part of the list;

extracting, from the electronic document, data corresponding to the at least a part of the list;

obtaining a first set of pages based on the extracted data;

identifying whether the first set of pages has a format that is supportable by the client based on media type information of the client, wherein the media type information of the client includes at least one of a resolution, a font, or a media type supportable by the client;

determining whether readability of the first set of pages displayed by the client is less than a reference value;

determining that the first set of pages is displayable by the client when the readability is greater than or equal to the reference value;

when identifying that a format of the first set of pages is not supportable by the client, converting the format of the first set of pages to the format that is supportable by the client; and transmitting, to the client, the first set of pages in the converted format, wherein the first set of pages to be transmitted to the client is identified based on log information indicating page numbers of the electronic document previously received by the client, wherein the first set of pages is subsequent to a second set of pages corresponding to the page numbers, and wherein the log information further indicates whether the second set of pages includes text or converted data including voice data.

2. The method of claim 1, wherein receiving the first request for the electronic document from the client comprises:

receiving, from the client, the media type information of the client.

3. The method of claim 1, further comprising:

identifying a conversion scheme for converting at least the part of the electronic document based on the log information; and converting the at least the part of the electronic document according to the conversion scheme.

4. A server for sharing an electronic document, the server comprising:

communication circuitry; and a processor configured to:

receive, from a client, a first request for an electronic document through the communication circuitry;

obtain a list based on the electronic document;

transmit the list to the client;

receive, from the client through the communication circuitry, a second request for selecting at least a part of the list;

extract, from the electronic document, data corresponding to the at least a part of the list;

obtain a first set of pages based on the extracted data;

identify whether the first set of pages has a format that is supportable by the client based on media type information of the client, wherein the media type information of the client includes at least one of a resolution, a font, or a media type supportable by the client;

determine whether readability of the first set of pages displayed by the client is less than a reference value;

determine that the first set of pages is displayable by the client when the readability is greater than or equal to the reference value;

when identifying that a format of the first set of pages is not supportable by the client, convert the format of the first set of pages to the format that is supportable by the client; and transmit, to the client, the first set of pages in the converted format, wherein the first set of pages to be transmitted to the client is identified based on log information indicating page numbers of the electronic document previously received by the client, wherein the first set of pages is subsequent to a second set of pages corresponding to the page numbers, and wherein the log information further indicates whether the second set of pages includes text or converted data including voice data.

5. The server of claim 4, wherein the communication circuitry receives, from the client, the media type information of the client.

6. The server of claim 4, wherein the processor determines whether to transmit the first set of pages to the client by determining whether the first set of pages is displayable by the client.

7. The server of claim 6, wherein the processor is further configured to convert the first set of pages to converted data based on the media type information when the first set of pages is not displayable by the client.

8. The server of claim 4, wherein the processor is further configured to convert the first set of pages to voice data when the readability is less than the reference value.

9. A method of sharing an electronic document by a client, the method comprising:

transmitting, to a server, a first request for an electronic document;

receiving, from the server, a list of the electronic document;

receiving an input for selecting at least a part of the list;

transmitting, to the server, a second request for selecting the at least a part of the list; and receiving at least a part of page data corresponding to the selected at least a part of the list, the page data generated based on media type information of the client, wherein the media type information of the client includes at least one of a resolution, a font, or a media type supportable by the client, wherein the list includes a plurality of items each of which has a plurality of page numbers, and the page data includes a first set of pages corresponding to a first set of page numbers of an item selected from the plurality of items, wherein the server determines whether readability of the first set of pages displayed by the client is less than a pre-stored reference value, and determines that the first set of pages is displayable by the client when the readability is greater than or equal to the reference value, wherein the first set of pages to be received by the client is identified based on log information indicating a second set of page numbers of the electronic document previously received by the client, wherein the first set of pages is subsequent to a second set of pages corresponding to the second set of page numbers, and wherein the second set of pages includes text or converted data including voice data.

10. The method of claim 9, wherein making the first request for the electronic document to the server comprises:

transmitting the media type information to the server.

11. A client for sharing an electronic document, the client comprising:
communication circuitry: and
a processor configured to:
transmit, to a server, a first request for an electronic document through the communication circuitry;
receive, from the server through the communication module, a list of the electronic document;
receive, through the communication circuitry, an input for selecting at least a part of the list;
transmit, to the server through the communication circuitry, a second request for selecting the at least a part of the list; and
receive at least a part of page data corresponding to the selected at least a part of the list through the communication circuitry, the page data generated based on media type information of the client, wherein the media type information of the client includes at least one of a resolution, a font, or a media type supportable by the client,
wherein the list includes a plurality of items each of which has a plurality of page numbers, and the page data includes a first set of pages corresponding to a first set of page numbers of an item selected from the plurality of items,
wherein the server determines whether readability of the first set of pages displayed by the client is less than a pre-stored reference value, and determines that the first set of pages is displayable by the client when the readability is greater than or equal to the reference value,
wherein the first set of pages to be received by the client is identified based on log information indicating a second set of page numbers of the electronic document previously received by the client,
wherein the first set of pages is subsequent to a second set of pages corresponding to the second set of page numbers, and
wherein the log information further indicates whether the second set of pages includes text or converted data including voice data.

12. The client of claim 11, wherein the communication circuitry makes the first request for the electronic document by transmitting the media type information to the server.

13. The method of claim 1, wherein the first set of pages is one of a Joint Photographic Experts Group (JPEG) data, text data, audio data and video data.

14. The method of claim 1, wherein the first set of pages is generated based on information relating to at least one application installed on the client.

15. The method of claim 1, wherein the list includes a plurality of items each of which has a plurality of page numbers, and the first set of pages corresponds to page numbers of an item selected from the plurality of items.

16. The server of claim 4, wherein the list includes a plurality of items each of which has a plurality of page numbers, and the first set of pages corresponds to page numbers of an item selected from the plurality of items.

17. The method of claim 1, further comprising converting the first set of pages to voice data when a size of characters in the first set of pages is less than a pre-stored reference size.

18. The server of claim 4, wherein the processor is further configured to convert the first set of pages to voice data when a size of characters in the first set of pages is less than a pre-stored reference size.

19. The client of claim 11, wherein the processor is further configured to convert the first set of pages to voice data when a size of characters in the first set of pages is less than a pre-stored reference size.

* * * * *